J. A. COSTELLO.

CARLINE FOR CAR ROOF FRAMES.

APPLICATION FILED FEB. 21, 1916.

Reissued Apr. 3, 1917.

14,281.

Witnesses:
Leo B. Green
B. C. Brown.

Inventor:
Joseph A. Costello
By Lynch & Arms
Attorneys.

UNITED STATES PATENT OFFICE.

JOSEPH A. COSTELLO, OF CLEVELAND, OHIO, ASSIGNOR TO CLEVELAND CAR SPECIALTY COMPANY, OF CLEVELAND, OHIO, A CORPORATION OF WEST VIRGINIA.

CARLINE FOR CAR-ROOF FRAMES.

14,281. Specification of Reissued Letters Patent. Reissued Apr. 3, 1917.

Original No. 1,033,548, dated July 23, 1912, Serial No. 693,095, filed April 25, 1912. Application for reissue filed February 21, 1916. Serial No. 79,767.

*To all whom it may concern:*

Be it known that I, JOSEPH A. COSTELLO, a citizen of the United States of America, residing at Cleveland, in the county of Cuyahoga and State of Ohio, have invented certain new and useful Improvements in Carlines for Car-Roof Frames; and I hereby declare the following to be a full, clear, and exact description of the invention, such as will enable others skilled in the art to which it pertains to make and use the same.

This invention relates to improvements in carlines for car-roof-frames, and pertains more especially to a carline consisting of an oblong pressed steel plate adapted to bridge the space between the side plates of a car-roof-frame and sloping upwardly toward the central portion of the carline from each end-portion of the carline and provided at the ends with downwardly projecting flanges arranged transversely of the carline and adapted to form lateral abutments for said side plates.

The primary object of this invention is to provide a metal carline having such contour or configuration that the carline is not only capable of conducting off water drained to and over the carline centrally between the sides of the carline, but has each end-portion thereof provided with three spaced seating surfaces adapted to rest on the side plate of a car-roof-frame, so that the carline upon its application to the side plates of a car-roof-frame is adequately seated on said side plates.

Another object is to produce a carline which more especially possesses great stiffness and strength in its end-portions.

Another object is not only to have the end-portions of the carline so contoured that the carline, upon its application to the side plates of a car-roof-frame, is adequately seated on said side plates, but that any tendency of said carline to rock or tip laterally is effectually opposed.

With these objects in view, and to the end of attaining any other advantages hereinafter appearing, this invention consists in certain peculiarities of construction, and combinations and arrangement of parts, hereinafter described, pointed out in the claims, and illustrated in the accompanying drawings.

Figure 1:
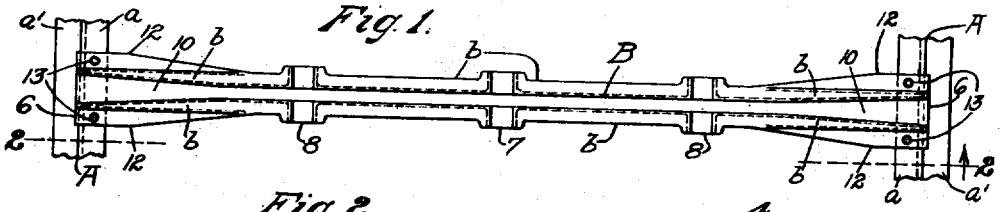
Figure 2:
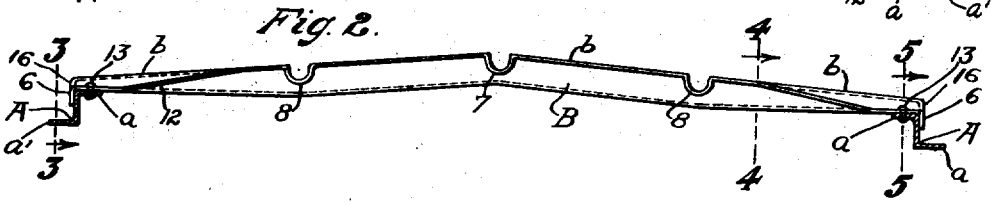
Figure 3:
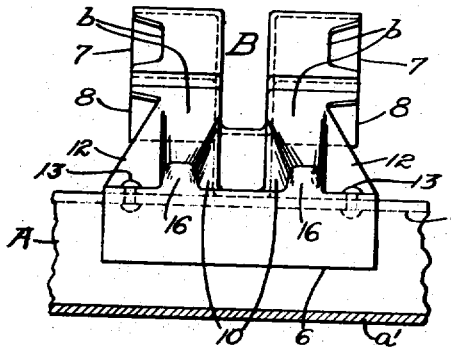
Figure 4:
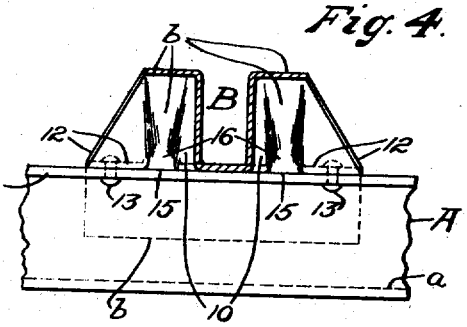
Figure 5:
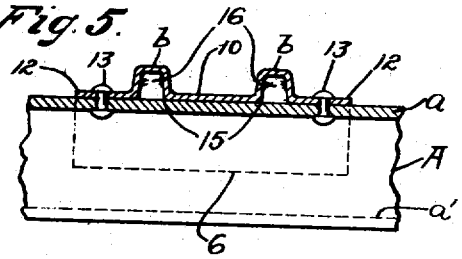

In said drawings, Figure 1 is a top plan of a carline embodying my invention. Fig. 2 is a vertical section on line 2—2, Fig. 1, looking in the direction indicated by the arrow. Fig. 3 is a vertical section on line 3—3, Fig. 2, looking inwardly. Fig. 4 is a vertical section on line 4—4, Fig. 2, looking outwardly. Fig. 5 is a vertical section on line 5—5, Fig. 2, looking outwardly. Figs. 3, 4 and 5 are drawn on a larger scale than Figs. 1 and 2 to more clearly show the contour of the carline.

Referring to the drawings, A and A indicate the two laterally spaced side plates of a car-roof-frame. Said side plates are arranged substantially horizontally and parallel. Each side plate B is provided at the top thereof with a laterally and inwardly projecting substantially horizontally arranged flange *a* which extends longitudinally of said side plate, and said side plate is shown provided at the bottom with a laterally and outwardly projecting flange *a'*. The side plates A are shown connected together by my improved metal carline which comprises a trough B which bridges the space between and is mounted on the upper flanges *a* of said side plates. The trough B slopes upwardly toward the central portion of the carline from each end-portion of the carline, and the carline is provided with two vertically downwardly projecting flanges 6 and 6 which are arranged at opposite ends respectively and transversely of the carline and overlap the outer side of opposite side plates A and A respectively. Each flange 6 therefore constitutes a lateral abutment for the outer side of the adjacent side plate A.

The trough B is provided at the top with two laterally and outwardly projecting flanges *b* and *b* arranged at opposite sides respectively of the trough. The flanges *b* and *b* extend from end to end of said trough. Said trough is deepest at or along the central portion of the carline and gradually reduced in depth toward the flanges 6. Said trough is provided at the top and centrally between the ends of the carline with two depressed portions 7 and 7 arranged at opposite sides respectively of the trough and adapted to form seats for a ridge-pole (not shown) of a car-roof-frame. Said trough is provided centrally between each flange 6 and the seat-forming portions 7 with two depressed portions 8 and 8 arranged at opposite sides respectively of the trough and adapted to form seats for a purlin (not shown) of a car-roof-frame. Each end-portion 10 of the trough B is enlarged in width toward each flange 6 from a point arranged in proximity to the adjacent depressed seat-forming portions 8, and the trough is widest at the flanges 6. The flanges *b* of the trough B are larger in width along the end-portions 10 of the trough than between said end-portions. The outer portions of the flanges *b* are depressed, as at 12, along the end-portions 10 of the trough, and the depressed portions 12 of said flanges are seated on the flanges *a* of the side plates A and riveted, as at 13, to said flanges of the side plates, and each flange 6 extends to the longitudinal edges of the adjacent depressed portions 12 of the flanges *b*. Preferably the depressed members 12 of each flange *b* of the trough B are arranged diagonally of the adjacent side of said trough and have their outer end-portions arranged horizontally and resting on the flanges *a* of the side plates A. That is, each depressed member of each trough-flange *b* slopes downwardly from the top of the trough in the direction of the adjacent flange 6 of the carline.

A carline having the contour hereinbefore described is not only capable by means of the trough B of conducting off water drained to and over the carline centrally between the sides of the carline, but possesses great stiffness and strength at and along the side plates A and between said side plates and the seat-forming portions 8 of the carline, and the carline is seated on each side plate at three points spaced longitudinally of the side plate.

It will be observed that the substantially horizontally arranged outer end-portion of the depressed part 12 of each end-portion of each side flange *b* is spaced from the adjacent side of the trough so as to effect the formation, between said side of the trough and said portion of said depressed part of said flange, of an air-space 15 arranged wholly above the adjacent side plate, as shown in Fig. 5, and said air-space is closed at the outer end of said portion of said depressed part of said flange by a portion 16 of the adjacent end flange 6 of the carline.

It will be observed also that not only does the outer end-portion of each depressed part 12 of each side flange *b* of the carline form a substantially horizontally arranged bearing member shown seated on the adjacent side plate, but that the bearing members thus formed at the sides of each end-portion of the trough and the bottom of said portion of the trough are shown arranged substantially in the same plane horizontally and wholly above the adjacent side plate, that said bearing members are spaced from the sides and arranged externally of the trough, that said bearing members are connected at their outer extremities with said bottom through the medium of the adjacent end flange 6 of the carline so as to reinforce said bearing members and maintain them accurately in place, and that one of said bearing members effectually opposes any tendency of the trough to rock or tip laterally in one direction and the other of said bearing members effectually opposes any tendency of the trough to rock or tip laterally in the opposite direction.

What I claim is:—

1. A metal carline comprising a trough adapted to bridge the space between the side plates of a car-roof-frame and provided with two downwardly projecting flanges which are arranged at opposite ends respectively and transversely of the carline, which trough is reduced in depth toward said flanges and has its end-portions gradually enlarged in width toward said flanges, said trough being widest at said flanges and provided at the top with two laterally and outwardly projecting flanges which are arranged at opposite sides respectively and extend longitudinally of the trough and have their outer portions depressed along the end-portions of the trough.

2. A metal carline comprising a trough adapted to bridge the space between the side plates of a car-roof-frame and provided with two downwardly projecting flanges which are arranged at opposite ends respectively and transversely of the carline, which trough is reduced in depth toward said flanges and provided at the top with two laterally and outwardly projecting flanges which are arranged at opposite sides respectively and extend longitudinally of the trough and are larger in width along the end-portions of the trough than between said end-portions and have their outer portions depressed along the end-portions of the trough and adapted to be seated on the side plates of a car-roof-frame.

3. A metal carline comprising a trough adapted to bridge the space between the side plates of a car-roof-frame and provided with two downwardly projecting flanges which are arranged at opposite ends respectively and transversely of the carline, which trough is reduced in depth toward said flanges and provided at the top with two laterally and outwardly projecting flanges which are arranged at opposite sides respectively and extend longitudinally of the trough and have their outer portions depressed along the end-portions of the trough, the depressed portions of each longitudinal flange of the trough being arranged diagonally of the adjacent side of the trough and having their outer end-portions adapted to be seated on the side plates of a car-roof-frame.

4. A metal carline comprising a trough adapted to bridge the space between the side plates of a car-roof-frame and provided with two downwardly projecting flanges which are arranged at opposite ends respectively of the carline, which trough is reduced in depth and enlarged in width toward said flanges and provided at the top with two laterally and outwardly projecting flanges which are arranged at opposite sides respectively and extend longitudinally of the trough and have their outer portions depressed along the end-portions of the trough and adapted to be seated on the side plates of a car-roof-frame, the first-mentioned flanges extending transversely of the carline to the longitudinal edges of the depressed portions of the second-mentioned flanges.

5. The combination, with the two laterally spaced side plates of a car-roof-frame, of a metal carline comprising a trough bridging the space between and mounted on and attached to said side plates and provided at each end with a downwardly projecting flange which overlaps the outer side of and constitutes a lateral abutment for the adjacent side plate, which trough is reduced in depth toward said flanges and provided at the top with two laterally and outwardly projecting flanges which are arranged at opposite sides respectively and extend longitudinally of the trough and have their outer portions depressed along the end-portions of the trough and seated on the side plates, the first-mentioned flanges extending transversely of the carline to the longitudinal edges of the depressed portions of the second-mentioned flanges.

6. The combination, with the two laterally spaced side plates of a car-roof-frame, of a metal carline comprising a trough bridging the space between and mounted on said side plates and provided at each end with a downwardly projecting flange which overlaps the outer side of and constitutes a lateral abutment for the adjacent side plate, which trough is reduced in depth toward said flanges and provided at the top with two laterally and outwardly projecting flanges which are arranged at opposite sides respectively and extend longitudinally of the trough and have their outer portions depressed along the end-portions of the trough, the depressed portions of the second-mentioned flanges being seated on and secured to the side plates.

7. A metal carline comprising a trough adapted to bridge the space between the side plates of a car-roof-frame, which trough is provided at the top with two laterally and outwardly projecting flanges which are arranged at opposite sides respectively and extend longitudinally of the trough and have portions thereof depressed along the end-portions of the trough to form bearing members, the depressed parts of each longitudinal flange of the trough being arranged diagonally of the adjacent side of the trough and having their outer end-portions adapted to be seated on the aforesaid side plates, said bearing members of each end-portion of the carline and the bottom of the adjacent end-portion of the trough being connected together at the outer extremity of said bottom and having their lower surfaces arranged in the same plane horizontally.

8. A metal carline having each end-portion thereof provided with three seating surfaces which are spaced transversely of the carline and arranged to rest on a side plate of a car-roof-frame, said carline comprising a trough which is adapted to bridge the space between the side plates of said car-roof-frame and has the lower surface of its bottom forming the intermediate of the aforesaid seating surfaces, said trough being provided at the top with two laterally and outwardly projecting flanges which are arranged at opposite sides respectively and extend longitudinally of the trough and have portions thereof depressed along the end-portions of the trough, there being an air-space formed between each depressed portion of each longitudinal flange and the adjacent side of the trough, which air-space extends to and is closed at the adjacent outer extremity of the trough.

9. The combination, with the two laterally spaced side plates of a car-roof-frame, of a metal carline which comprises a trough bridging the space between and extending over and attached to said side plates and is provided next above each side plate with three seating surfaces which are spaced longitudinally of said side plate and connected together at the outer side of said side plate, said trough being provided at the top with two laterally and outwardly projecting flanges which are arranged at opposite sides respectively and extend longitudinally of the trough and have portions thereof depressed along the end-portions of the trough, the depressed parts of said flanges being arranged diagonally of the sides of the trough and having their outer end-portions forming the outer of the aforesaid seating surfaces.

10. The combination, with the two laterally spaced side plates of a car-roof-frame, of a metal carline which comprises a trough bridging the space between and extending over and attached to said side plates and is provided over each side plate with three seating surfaces which are spaced longitudinally of said side plate, said trough being provided at the top with two laterally and outwardly projecting flanges which are arranged at opposite sides respectively and extend longitudinally of the trough and have portions thereof depressed along the end-portions of the trough, the depressed parts of said flanges being arranged diagonally of the sides of the trough and having their outer end-portions forming the outer of the aforesaid seating surfaces, and there being an air-space formed between each depressed portion of each of said flanges and the adjacent side of the trough, which air-space extends to the outer side of the adjacent side plate.

In testimony whereof I sign the foregoing specification in the presence of two witnesses.

JOSEPH A. COSTELLO.

Witnesses:

B. C. Brown,

V. C. Lynch.

Copies of this patent may be obtained for five cents each, by addressing the "Commissioner of Patents, Washington, D. C."